United States Patent Office
3,483,938
Patented Dec. 16, 1969

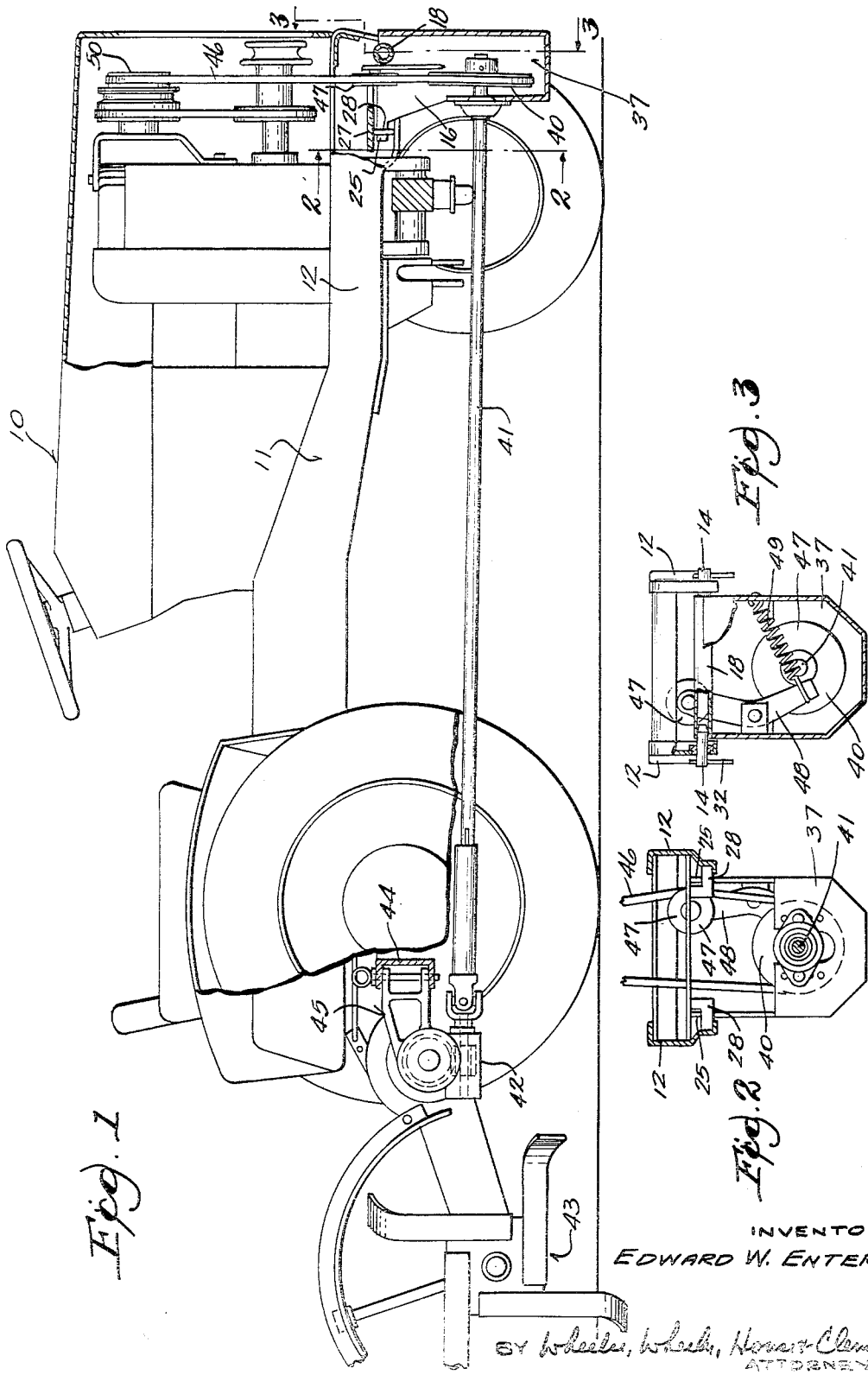

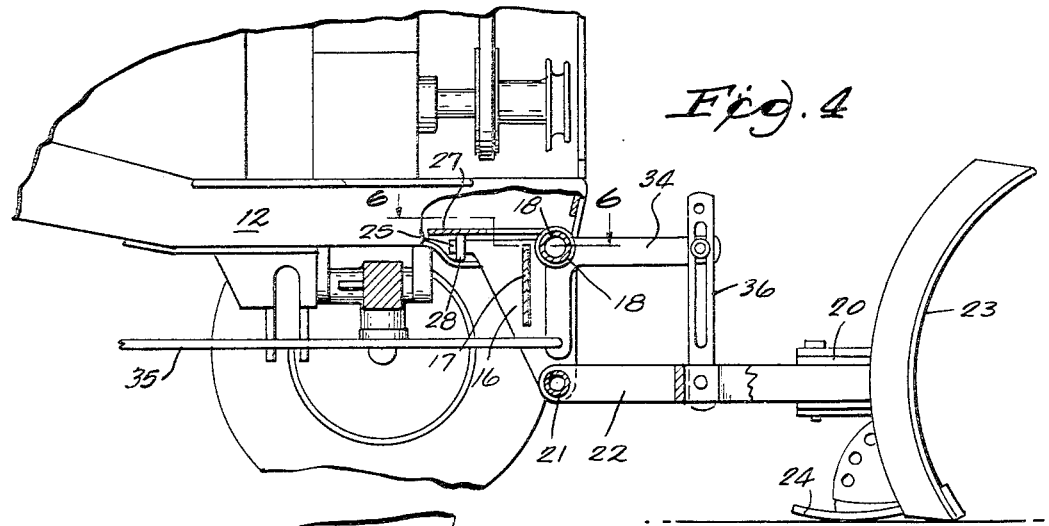
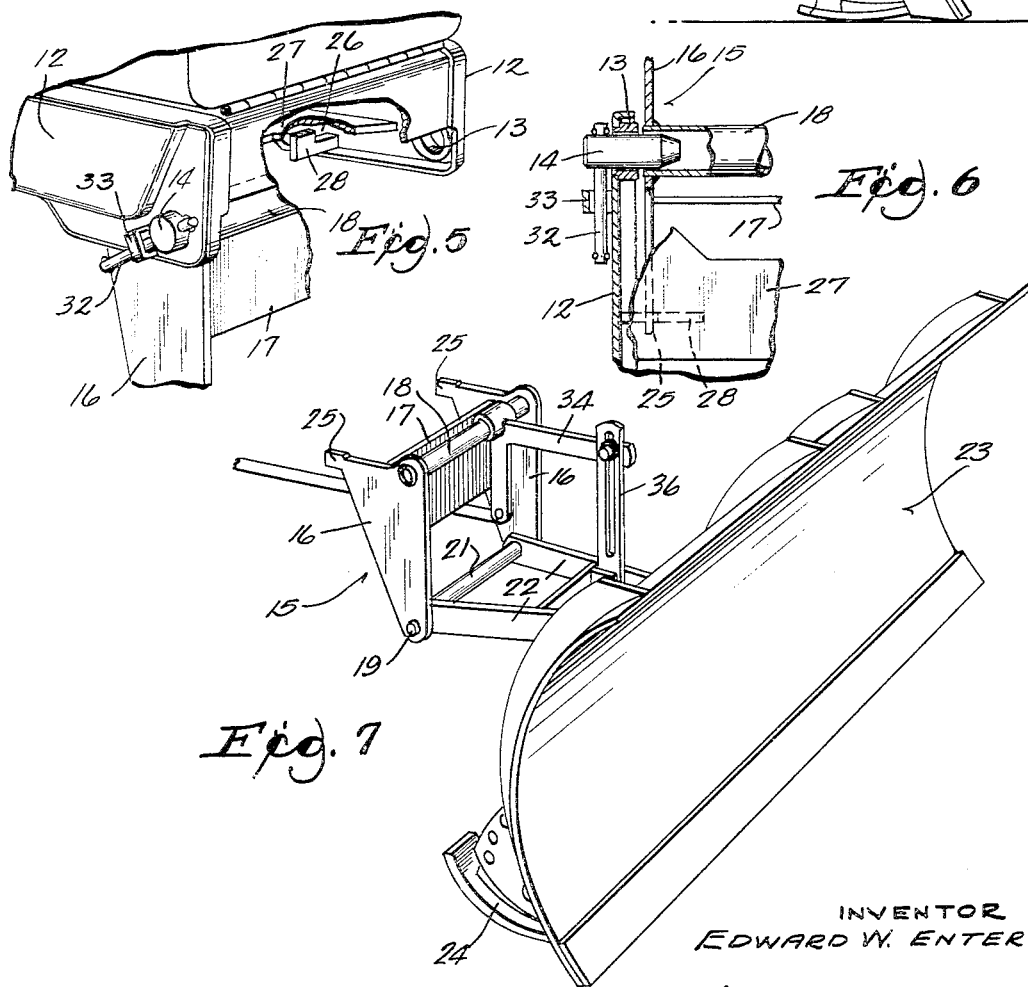

3,483,938
VEHICLE FRONT HITCH SUPPORTED POWER TAKEOFF
Edward W. Enters, Fredonia, Wis., assignor to Gilson Bros. Co., Plymouth, Wis., a corporation of Wisconsin
Filed Dec. 7, 1967, Ser. No. 688,882
Int. Cl. B60k 25/00, 17/28; E02f 3/76
U.S. Cl. 180—53                                   1 Claim

ABSTRACT OF THE DISCLOSURE

This disclosure relates to a front hitch for coupling tractor attachments to the front of the tractor, the tractor front having side beams with laterally aligned pin sockets, the attachment having a hanger bracket removably received between the beams and having a cross tube which aligns with the pin sockets, and trunnion pins telescopically receivable through the sockets and into the ends of the cross tube to couple the hanger bracket to the tractor.

Summary of the invention

In accordance with the present invention, attachments are quickly and easily mounted and demounted to the front of a tractor. The tractor has spaced side beams with laterally aligned pin receiving openings or sockets. The attachment includes a mounting or hanger bracket removably received between the beams and having pin sockets aligned with the pin sockets on the frame. The mounting bracket is mounted, without the assistance of tools, by inserting trunnion pins through the aligned sockets on the tractor frame and mounting bracket.

In the preferred embodiments herein disclosed, the sockets on the mounting bracket are within the ends of a cross tube which spans across end plates on the mounting bracket. These end plates also constitute bracing arms which bear against the tractor to restrain rotation of the bracket about the pin axis. In some embodiments, the bracing arms have tangs or the like which are received within tang sockets provided on the tractor, thus to further anchor mounting bracket against rotation about the pin axis.

Other objects, features, and advantages of the invention will appear from the following disclosure.

Description of the drawings

FIG. 1 is a side view, partly in vertical cross section, showing a tractor and a rear mounted tiller attachment. A belt transmission to power the tiller is mounted on a front hitch coupling embodying the present invention.

FIG. 2 is a cross section taken along line 2—2 of FIG. 1.

FIG. 3 is a cross section taken along the line 3—3 of FIG. 1.

FIG. 4 is a fragmentary vertical cross section showing a front hitch coupling embodying the present invention, utilized to mount a plow or dozer blade at the front of the tractor.

FIG. 5 is a fragmentary perspective view of the lower front corner of the tractor, showing the mounting bracket in mounted position, portions being broken away to expose details.

FIG. 6 is a fragmentary cross section taken along the line 6—6 of FIG. 4.

FIG. 7 is a perspective view of a plow or dozer blade and its mounting bracket.

Description of the preferred embodiments

Although the disclosure hereof is detailed and exact to enable those skilled in the art to practice the invention, the physical embodiments herein desclosed merely exemplify the invention which may be embodied in other specific structure. The scope of the invention is defined in the claims appended hereto.

Tractor 10 is provided with a frame 11 including side beams 12 which are spaced laterally apart, as best shown in FIG. 5. Near the lower front corners of each beam 12 there is a trunnion pin receiving socket 13 which constitutes a bearing support for a trunnion pin 14 by which the hanger attachment 15 is mounted on the tractor.

One embodiment of hanger attachment 15 is best shown in FIG. 7. There are side or end plates 16 supported in spaced apart parallel relation by cross plate 17 and cross tube 18. Near their lower ends, end plates 16 carry a pivot shaft 19 about which tube 21 is pivotally received. Push arms 22 of the blade 23 are attached at their ends to the tube 21. Blade 23 is also provided with skid shoes 24 and a coupling 20 for the push arms 22.

Side plates 16 of the hanger or mounting bracket 15 have their upper ends extended rearwardly and terminating in tangs 25. Tangs 25 are removably received within sockets 26 formed on the tractor between horizontal cross plate 27 and a corner notch formed in a corner block 28.

When the hanger bracket 15 is mounted on the tractor, its side plates or arms 16 are nested between the tractor side beams 12, the tangs 25 are inserted in the sockets 26, and the cross tube 18 is aligned with the pin receiving openings or sockets 13 in the side beams. The trunnion pins 14 are then inserted, as shown in FIG. 6, to telescopically enter the beam sockets 13 and the sockets 31 which are at the ends of the cross tube 18, thus to couple the mounting bracket 15 to the tractor. This coupling is easily accomplished without the use of any tools. Engagement of the tangs 25 is sockets 26 prevents pivotal movement of the hanger bracket 15 about the axis of trunnion pins 14. If pivotal movement in a counterclockwise direction, as shown in FIG. 4, is not objectionable or is otherwise restrained, the tangs 25 can be omitted. In any event, the top edges of side plates 16 bear against the undersurface of tractor plate 27 to brace the bracket 15 against clockwise motion, as viewed in FIG. 4. When the tangs 25 are provided, they lock the bracket 15 against counterclockwise movement, as viewed in FIG. 4.

Trunnions 14 are desirably provided with keeper stems 32 which can be shifted along their own axes to enter and withdraw from the keeper eyes or coupling sockets 33 mounted on the beams 12. Accordingly, when the stems 32 are engaged in eyes 33, the trunnions are held against loss.

In the embodiment shown in FIGS. 4 through 7, cross tube 18 conveniently provides a pivot axis for a bell crank 34 by which the thrust of control rod 35 may be transmitted to the lift link 36 which is pivotally mounted on the blade arm 22, thus to adjust the height of the blade 23.

In the embodiment of FIGS. 1, 2, and 3, the attachment is mounted on the rear of the tractor. The hitch coupling at the front of the tractor provides an easily removed mounting for a belt transmission 37. The hanger bracket and hitch coupling are identical in all respects with that previously described, and the same reference characters are applied thereto.

In this embodiment, a pulley 40 in the belt transmission housing 37 is powered from the tractor PTO 50. Pulley 40 is on a drive shaft 41 which extends rearwardly to the gear transmission 42 of a rotary tiller 43 mounted on the draw bar 44 of the tractor on a bracket 45.

As best shown in FIGS. 2 and 3, the belt 46 which drives pulley 40 from the PTO 50 is kept taut by an idler pulley 47 mounted on a swing arm 48 under the pressure of spring 49.

The rotary tiller 43 is merely one example of an implement with its implement transmission 42 which can be mounted at the rear of the tractor.

If it is desired that the attachment mounted on bracket 15 be free to swing with respect to the tractor, the wings or plates 16 may be cut away so as not to interfere with such movement. In that event the bracket 15 is free to pivot about the axis of the pins 14.

I claim:

1. A front hitch for coupling tractor attachments to the front of a tractor, said hitch comprising said tractor having spaced side beams with laterally aligned pin sockets, said attachment including a mounting bracket removably received between said beams and having pin sockets at its sides aligned with the pin sockets in said side beams, and trunnion pins removably receivable in said sockets to couple the mounting bracket to the tractor, said attachment comprising an implement having an implement transmission mounted at the rear of the tractor, a power transmission connected to said hanger bracket and drive mechanism from a tractor engine to the power transmission and from the power transmission to the implement transmission.

References Cited

UNITED STATES PATENTS

| | | | |
|---|---|---|---|
| 1,536,081 | 5/1925 | Dean | 180—53 |
| 2,489,274 | 11/1949 | Donald | 180—53 |
| 2,770,894 | 11/1956 | Gettleman | 180—53 |
| 3,187,821 | 6/1965 | Kamlukin | 180—53 X |
| 3,376,946 | 4/1968 | Paulson | 280—481 X |
| 3,388,929 | 6/1968 | Miley | 280—481 |

A. HARRY LEVY, Primary Examiner

U.S. Cl. X.R.

172—801, 806; 280—481